United States Patent
Boehm et al.

(10) Patent No.: US 12,461,693 B2
(45) Date of Patent: *Nov. 4, 2025

(54) TEMPERATURE MONITORING FOR MEMORY DEVICES

(71) Applicant: Micron Technology, Inc., Boise, ID (US)

(72) Inventors: Aaron P. Boehm, Boise, ID (US); Todd Jackson Plum, Boise, ID (US); Scott D. Van De Graaff, Boise, ID (US); Scott E. Schaefer, Boise, ID (US); Mark D. Ingram, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,049

(22) Filed: Apr. 10, 2024

(65) Prior Publication Data
US 2024/0256187 A1     Aug. 1, 2024

Related U.S. Application Data

(63) Continuation of application No. 17/464,333, filed on Sep. 1, 2021, now Pat. No. 11,977,772.
(Continued)

(51) Int. Cl.
G06F 3/06 (2006.01)

(52) U.S. Cl.
CPC .......... G06F 3/0659 (2013.01); G06F 3/0604 (2013.01); G06F 3/0653 (2013.01); G06F 3/0679 (2013.01)

(58) Field of Classification Search
CPC .... G06F 3/0659; G06F 3/0604; G06F 3/0653; G06F 3/0679
See application file for complete search history.

(56) References Cited

U.S. PATENT DOCUMENTS

| 8,122,187 B2* | 2/2012 | Walker | G11C 11/406 |
| | | | 711/106 |
| 2008/0270691 A1* | 10/2008 | Belady | G11B 33/142 |
| | | | 711/E12.005 |

(Continued)

FOREIGN PATENT DOCUMENTS

| KR | 10-2016-0113580 A | 9/2016 |
| KR | 10-2019-0048078 A | 5/2019 |
| KR | 10-2019-0091097 A | 8/2019 |

OTHER PUBLICATIONS

WatElectronics, Whatisa DigitalCounter: Tyoes&Applications,Jul. 2020,availableat:https://Avww.watelectronics.com/what-is-a-digital-counter-types-applications/ (Year: 2020).*

(Continued)

Primary Examiner — Ryan Bertram
(74) Attorney, Agent, or Firm — Holland & Hart LLP

(57) ABSTRACT

Methods, systems, and devices for temperature monitoring for memory devices are described for monitoring one or more temperature ranges experienced by a memory device. The memory device may include monitoring circuitry or logic that may identify one or more durations of operating the memory device within the one or more temperature ranges. The memory device may store an indication of the one or more durations, or an indication of information associated with the one or more durations. The indication may be accessed a host device associated with the memory device or may be transmitted by the memory device to the host device. The host device may use information included in the indication to perform an operation associated with the memory device.

18 Claims, 8 Drawing Sheets

Related U.S. Application Data

(60) Provisional application No. 63/084,240, filed on Sep. 28, 2020.

(56) References Cited

U.S. PATENT DOCUMENTS

| | | | |
|---|---|---|---|
| 2011/0265090 A1* | 10/2011 | Moyer | G06F 1/3203 |
| | | | 707/812 |
| 2012/0133376 A1* | 5/2012 | Wang | G06F 3/0416 |
| | | | 324/676 |
| 2012/0300570 A1 | 11/2012 | Kim et al. | |
| 2014/0173268 A1* | 6/2014 | Hashimoto | G11C 29/52 |
| | | | 713/2 |
| 2014/0181596 A1 | 6/2014 | Rusu et al. | |
| 2015/0143026 A1 | 5/2015 | Reddy et al. | |
| 2015/0301744 A1* | 10/2015 | Kim | G06F 3/0659 |
| | | | 711/103 |
| 2016/0196062 A1 | 7/2016 | Nakata et al. | |
| 2016/0306592 A1* | 10/2016 | Oh | G06F 3/0653 |
| 2018/0067678 A1* | 3/2018 | Jeong | G06F 3/0616 |
| 2018/0101204 A1 | 4/2018 | Fackenthal | |
| 2018/0120871 A1 | 5/2018 | Santos et al. | |
| 2018/0349243 A1* | 12/2018 | Shin | G06F 3/0653 |
| 2019/0051363 A1* | 2/2019 | Raasch | G11C 16/3495 |
| 2019/0129847 A1 | 5/2019 | Roh | |
| 2019/0237152 A1 | 8/2019 | Lee et al. | |
| 2019/0295666 A1 | 9/2019 | Parry et al. | |
| 2019/0384504 A1 | 12/2019 | Galbraith et al. | |
| 2020/0097217 A1* | 3/2020 | Yeh | G11C 16/10 |
| 2020/0174535 A1 | 6/2020 | Holmstrom et al. | |
| 2021/0397363 A1* | 12/2021 | Boehm | G06F 11/3409 |
| 2024/0134727 A1* | 4/2024 | Allen | G06F 11/004 |

OTHER PUBLICATIONS

"International Search Report and Written Opinion of the International Searching Authority," issued in connection with Int'l Appl. No. PCT/US21/49825, dated Dec. 24, 2021 (9 pages).

WatElectronics, What is a Digital Counter: Types & Applications, Jul. 2020, available at: https://www.watelectronics.com/what-is-a-digital-counter-types-applications/ (Year: 2020).

* cited by examiner

TEMPERATURE MONITORING FOR MEMORY DEVICES

CROSS REFERENCE

The present application for patent is a continuation of U.S. patent application Ser. No. 17/464,33 by BOEHM et al., entitled "TEMPERATURE MONITORING FOR MEMORY DEVICES," filed Sep. 1, 2021, which claims priority to and the benefit of U.S. Provisional Patent Application No. 63/084,240 by BOEHM et al., entitled "TEMPERATURE MONITORING FOR MEMORY DEVICES," filed Sep. 28, 2020, each of which are assigned to the assignee hereof, and each of which are expressly incorporated by reference in their entirety herein.

FIELD OF TECHNOLOGY

The following relates generally to one or more systems for memory and more specifically to temperature monitoring for memory devices.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
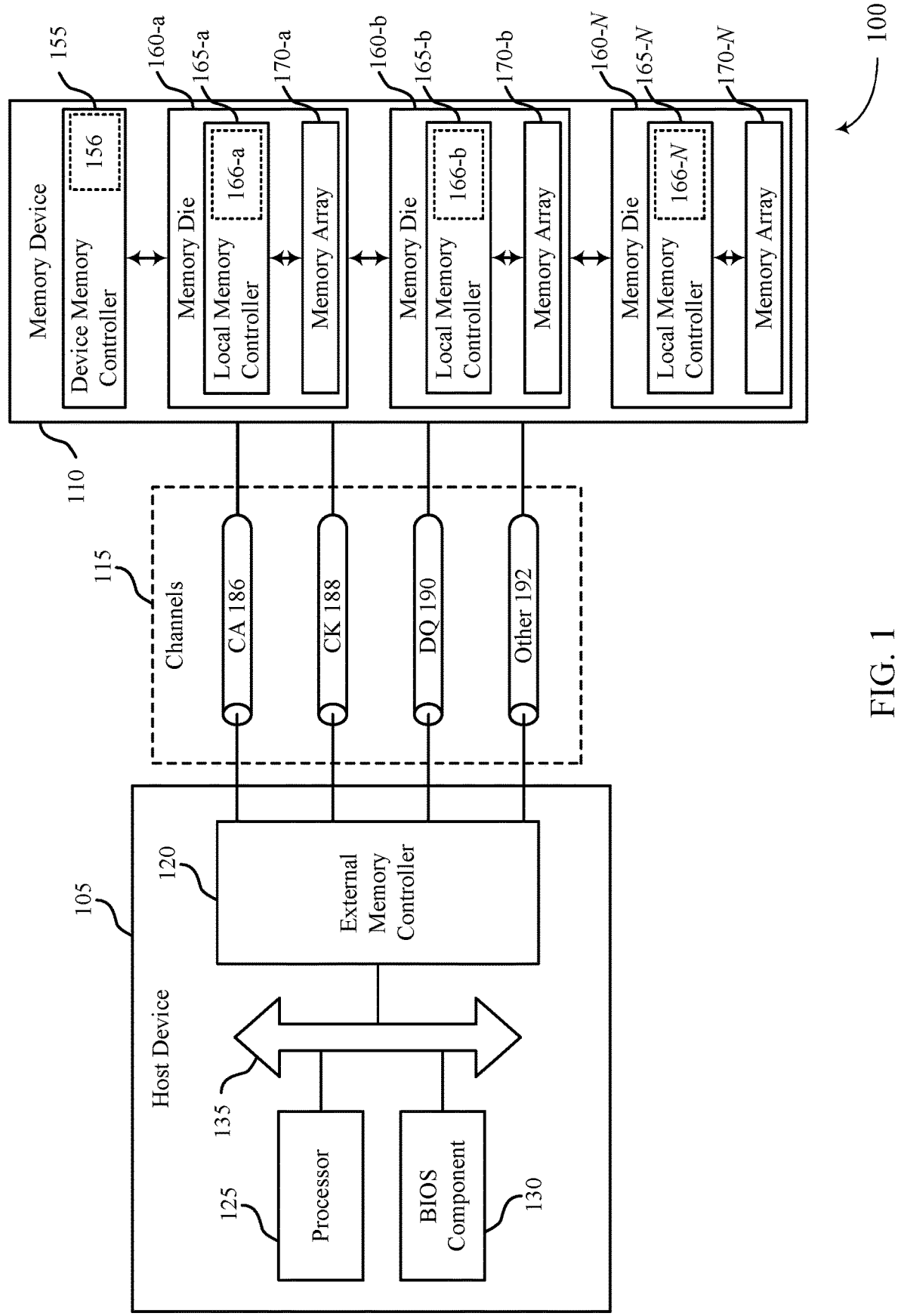
FIG. 1 illustrates an example of a system that supports temperature monitoring for memory devices in accordance with examples as disclosed herein.

In some memory devices, one or more physical or operational aspects of a memory device may degrade over time. The degradation may be associated, for example, with a reduction of an ability to reliably store information, a reduction of an ability to reliably read information, a reduction of an ability to process information, or a reduction of an ability to communicate information (e.g., between the memory device and a host device), among other issues. Degradation of the memory device may be associated with a cumulative duration over which a temperature of the memory device or one or more components thereof satisfies a threshold, among other durations or conditions. As such, temperatures experienced—either in a given duration or cumulatively over multiple durations or a longer duration—by a memory device may affect a reliability or a life expectancy (or both) of the memory device, among other aspects. In some cases, potential estimates of expected temperatures (e.g., times in which the memory device experiences different expected temperatures) over the life of the memory device may not represent actual conditions experienced by the memory device over the lifetime of the memory device, which may result in higher manufacturing costs for the memory device, reduced reliability of the memory device, creates parts that are far above potential constraints or operating conditions, or reduced life expectancy of the memory device, among other examples.

The present disclosure provides techniques for monitoring health and life expectancy of the memory device by monitoring one or more temperature ranges experienced, for example, by the memory device or a component thereof. Such monitoring may include or involve components internal to the memory device, such as a monitoring circuit of a device memory controller, one or more monitoring circuits of one or more local memory controllers, or various combinations thereof. The monitoring circuits (e.g., monitoring logic) may identify and store various indications of a duration of operating the memory device within the one or more temperature ranges, among other indications. Such components may include counters or other circuits or logic to determine one or more durations of operating the memory device within the one or more temperature ranges.

The one or more durations may refer to a duration that occurs over time, such as over multiple power cycles (e.g., a single power cycle duration or a duration over a life of the memory device). The memory device may store an indication of the one or more durations, for example, at a volatile storage component, or a non-volatile storage component of the memory device, or any combination thereof. In some cases, a host device associated with the memory device may access the one or more durations, or associated information, at the volatile storage component or the non-volatile storage component. In some cases, the memory device may transmit an indication of the one or more durations (e.g., or associated information) to the host device. By supporting these and other evaluations related to durations of operating the memory device within the one or more temperature ranges, a system including the memory device may support various proactive measures to maintain operational reliability. Such measures may include indicating memory device temperature information to one or more other devices, indicating that the memory device should be replaced, modifying operation (e.g., timing parameters, voltage parameters, access rates) of an aging memory device, or selecting a different memory device or memory die of the same or different memory device for various data storage or access operations.

Features of the disclosure are initially described in the context of systems and dies as described with reference to FIGS. 1 and 2. Features of the disclosure are described in the context a process flow and a monitoring architecture as described with reference to FIGS. 3 and 4. These and other features of the disclosure are further illustrated by and described with reference to an apparatus diagram and flowcharts that relate to temperature monitoring for memory devices as described with reference to FIGS. 5-8.

FIG. 1 illustrates an example of a system 100 that supports temperature monitoring for memory devices in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110). The system 100 may additionally or alternatively represent a memory subsystem, and in some cases, may be referred to as a memory device 110 or memory devices 110.

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100 (e.g., by the host device 105). In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135. In some cases, the host device 105 may represent an example of a graphics processing unit (GPU).

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a GPU, a general purpose GPU (GPGPU), or a system on a chip (SoC), among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package. The memory device 110 (e.g., the device memory controller 155, one or more memory dies 160, one or more local memory controllers 165, one or more memory arrays 170) may be configured to operate in response to commands from the host device 105 (e.g., from the external memory controller 120, from the processor 125).

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. For example, the channels 115 may be an example of a physical or logical interface (e.g., a bus, a set of pins) with or between a host device 105 (e.g., an external memory controller 120, a processor 125) and a memory device 110 (e.g., a device memory controller 155, one or more memory dies 160, one or more local memory controllers 165, one or more memory arrays 170).

Each channel 115 may be an example of a transmission medium that carries information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, clock signal channels 188 may be operable to communicate one or more clock signals between the host device 105 and the memory device 110. Each clock signal may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

In some examples, physical or operational aspects of the memory device 110 may degrade over time. This degradation may be associated with a reduction of an ability to reliably store information (e.g., at a memory array 170), a reduction of an ability to reliably read information (e.g., from a memory array 170), a reduction of an ability to process information (e.g., at a local memory controller 165, at a device memory controller 155), or a reduction of an ability to communicate information (e.g., within the memory device 110, between the memory device 110 and the host device 105), among other issues. Degradation of the memory device 110 may be associated with a cumulative duration over which a temperature of the memory device 110 or one or more memory dies 160 satisfies a threshold, among other durations or conditions. For example, over time, memory cells of a memory array 170 or associated components or circuitry of the memory device 110 or one or more memory dies 160 may experience dielectric breakdown, ion or other constituent material migration or transformation, thermal stress or damage, mechanical stress or damage, fatigue, or other changes that may affect operational reliability of the memory device 110.

As such, temperatures experienced by a memory device 110 (e.g., or by one or more components thereof) may affect a reliability or a life expectancy (or both) of the memory device 110 (e.g., or the one or more components thereof). In some cases, estimates of the expected temperatures (e.g., times the memory device is expected to experience different temperatures) over the life of the memory device 110 may not represent actual conditions experienced by a particular memory device 110 over the lifetime of the memory device 110. For example, temperature estimates may fail to provide or account for detailed information about changes in temperatures or exact temperature levels experience by the memory device 110. Because of the lack of reliable temperature information, the memory device 110 may be configured in a way that may result in higher manufacturing costs, overprovisioning or overdesigning, reduced reliability, or reduced life expectancy, among other examples.

In accordance with examples as disclosed herein, the memory device 110 (e.g., the device memory controller 155, one or more memory dies 160) may include various components (e.g., logic, circuitry) configured for monitoring health and life expectancy of the memory device 110. Such monitoring may include or involve components internal to the memory device 110, such as a monitoring circuit 156 of a device memory controller 155, one or more monitoring circuits 166 of one or more local memory controllers 165, or various combinations thereof, that identify and store various indications of a duration of operating the memory device 110 (e.g., one or more durations for operating at one or more temperatures), among other indications.

In some examples, such components may include counters or other circuits or logic to determine various operational durations (e.g., temperature durations), such as device-level durations (e.g., at a monitoring circuit 156), die-level durations (e.g., at a monitoring circuit 166), or any combination thereof. An operational duration may refer to a duration that is accumulated over time or over multiple power cycles (e.g., a lifetime duration, a duration over the life of a memory device 110 or memory die 160 that an operational parameter has satisfied a threshold), or is accumulated by instance (e.g., a particular duration over which a temperature satisfies a threshold, which may be stored separately from another such duration or instance, and may or may not be associated with a timestamp). In some examples, monitoring circuits 156 or monitoring circuits 166 may include sensors or monitors for detecting operating parameters (e.g., a temperature sensor), or monitoring circuits 156 or monitoring circuits 166 may receive such information from another component (e.g., of the memory device 110, of a host device 105).

The information from the sensors or other components may be used to evaluate operating parameters at the memory device 110, and may support accumulating durations over which an operating parameter (e.g., a temperature) satisfies a threshold. Additionally or alternatively, such information may support a component of the memory device 110 tracking or identifying an immediate or instantaneous violation, such as an excessive temperature condition, and storing an indication of an instance of such a violation by setting a flag (e.g., indicating a presence of such a violation), or incrementing a counter of operating condition violations (e.g., tracking a quantity of such violations), among other techniques, which may or may not be associated with or otherwise correspond to a stored duration of such a violation (e.g., a duration of the excessive temperature condition).

In some examples, the memory device 110 (e.g., a monitoring circuit 156, a monitoring circuit 166) may include a non-volatile storage component for storing indications of operating durations of the memory device 110, which may include or refer to a storage component that is included in or separate from the memory arrays 170 of the memory device 110. In various examples, such a non-volatile storage component may be physically coupled with or otherwise attached to a same substrate as a memory array 170 or a memory die 160 (e.g., a same chip or other semiconductor substrate), or a same substrate as the memory device 110 (e.g., a same printed circuit board (PCB) or other memory module, such as a substrate of a dual in-line memory module (DIMM)).

In some examples, the memory device 110 (e.g., the device memory controller 155, a monitoring circuit 156, one or more local memory controllers 165, one or more monitoring circuits 166) may perform internal operations using a stored duration (e.g., a temperature duration), such as calculations or comparisons to duration thresholds, to evaluate health or life expectancy of the memory device 110. The memory device 110 may provide such indications or related indications to a host device 105 (e.g., via channels 115) or the host device 105 may retrieve the indications or the related indications from the memory device 110. In some examples, the memory device 110 may provide operating durations to the host device 105 (e.g., based on proactive signaling, based on responding to polling or other requests from the host device 105, or based on retrieval by the host device 105), and the host device 105 (e.g., the external memory controller 120, the processor 125) may perform calculations or comparisons external to the memory device 110 to evaluate health or life expectancy of the memory device 110 (e.g., based on one or more operating durations determined or stored at the memory device 110 and signaled to the host device 105).

By supporting these and other evaluations related to operational durations of the memory device 110, the system 100 may support various proactive measures to maintain operational reliability, including indicating that the memory device 110 should be replaced, modifying operation (e.g., timing parameters, voltage parameters, access rates) of an aging memory device 110, or selecting a different memory device 110 or memory die 160 of the same or different memory device 110 for various data storage or access operations.

Figure 2:
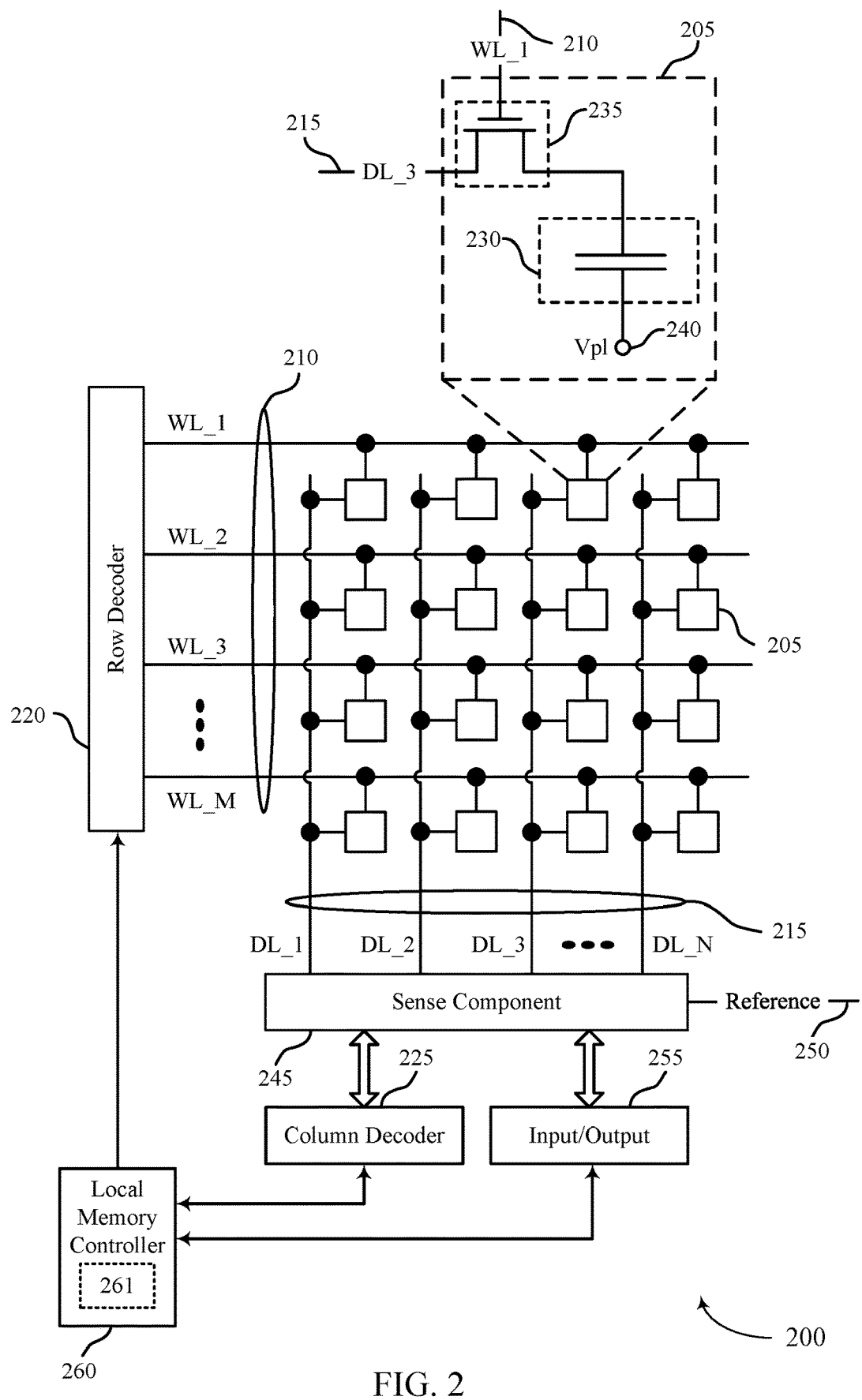
FIG. 2 illustrates an example of a memory die that supports temperature monitoring for memory devices in accordance with examples as disclosed herein.

FIG. 2 illustrates an example of a memory die 200 that supports temperature monitoring for memory devices in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state, which may be an example of a volatile storage component that may be used in the memory cells 205. In other memory architectures, other volatile or non-volatile storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different components, such as memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200, which may be an example of operating the memory die 200 in response to a command from a host device 105. During a write operation, a memory cell 205 of the memory die 200 may be programmed to store a desired logic state. The local memory controller 260 may identify a target memory cell 205 on which to perform the write operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The local memory controller 260 may apply a specific signal (e.g., write pulse) to the digit line 215 during the write operation to store a specific state (e.g., charge) in the capacitor 230 of the memory cell 205. The pulse used as part of the write operation may include one or more voltage levels over a duration.

The local memory controller 260 may be operable to perform a read operation (e.g., a sense operation) on one or more memory cells 205 of the memory die 200, which may be another example of operating the memory die 200 in response to a command from a host device 105. During a read operation, the logic state stored in a memory cell 205 of the memory die 200 may be determined. The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference 250. Based on that comparison, the sense component 245 may determine a logic state that is stored on the memory cell 205.

As described with reference to FIG. 1, some physical or operational aspects of the memory die 200 may degrade over time. In accordance with examples as disclosed herein, the memory die 200 (e.g., the local memory controller 260) may include various components (e.g., logic, circuitry) configured for monitoring health and life expectancy of the memory die 200. Such monitoring may include or involve components internal to the memory die 200 that identify and store various indications of a duration of operating the memory die 200, such as a monitoring circuit 261 which may be an example of a monitoring circuit 166 described with reference to FIG. 1.

In some examples, the monitoring circuit 261 may include one or more counters or other circuits or logic to determine various operational durations, which may refer to die-level durations of the memory die 200. In some examples, the monitoring circuit 261 may include sensors or monitors for detecting operating parameters (e.g., a temperature sensor), or the monitoring circuit 261 may receive such information from another component (e.g., from within the memory die 200 or from outside the memory die 200 or both). The memory die 200 may include a non-volatile storage component for storing indications of operating durations (e.g., one or more temperature durations) of the memory die 200, which may include or refer to one or more of the memory cells 205, one or more memory cells different than the memory cells 205 (e.g., memory cells of the monitoring circuit 261, which may have a different degree of volatility than the memory cells 205), or some other storage component of the memory die 200 (e.g., of the monitoring circuit 261). The non-volatile storage component may be physically coupled with or otherwise attached to a same substrate as the memory cells 205 or may be separate from the memory die 200. For example, one or more components of the memory die 200, including the non-volatile storage component, may be physically coupled with or otherwise attached to a same substrate (e.g., a same chip or other semiconductor substrate).

In some examples, the memory die 200 may provide an indication of one or more durations to a device memory controller 155 of a memory device 110 that includes the memory die 200, or a host device 105 (e.g., via a device memory controller 155, via channels 115). In some examples, the memory device 110 or the host device 105 may retrieve the indication of the one or more durations from non-volatile storage or volatile storage of the memory die 200. By supporting these and other evaluations related to operational durations of the memory die 200, a memory device 110 or host device 105 may support various proactive measures to maintain operational reliability, including indicating that the memory die 200, or the memory device 110 that includes the memory die 200, should be replaced, modifying operation (e.g., timing parameters, voltage parameters, access rates) of an aging memory die 200, or selecting a different memory die 200 of the same or different memory device 110 for various data storage or access operations.

Figure 3:
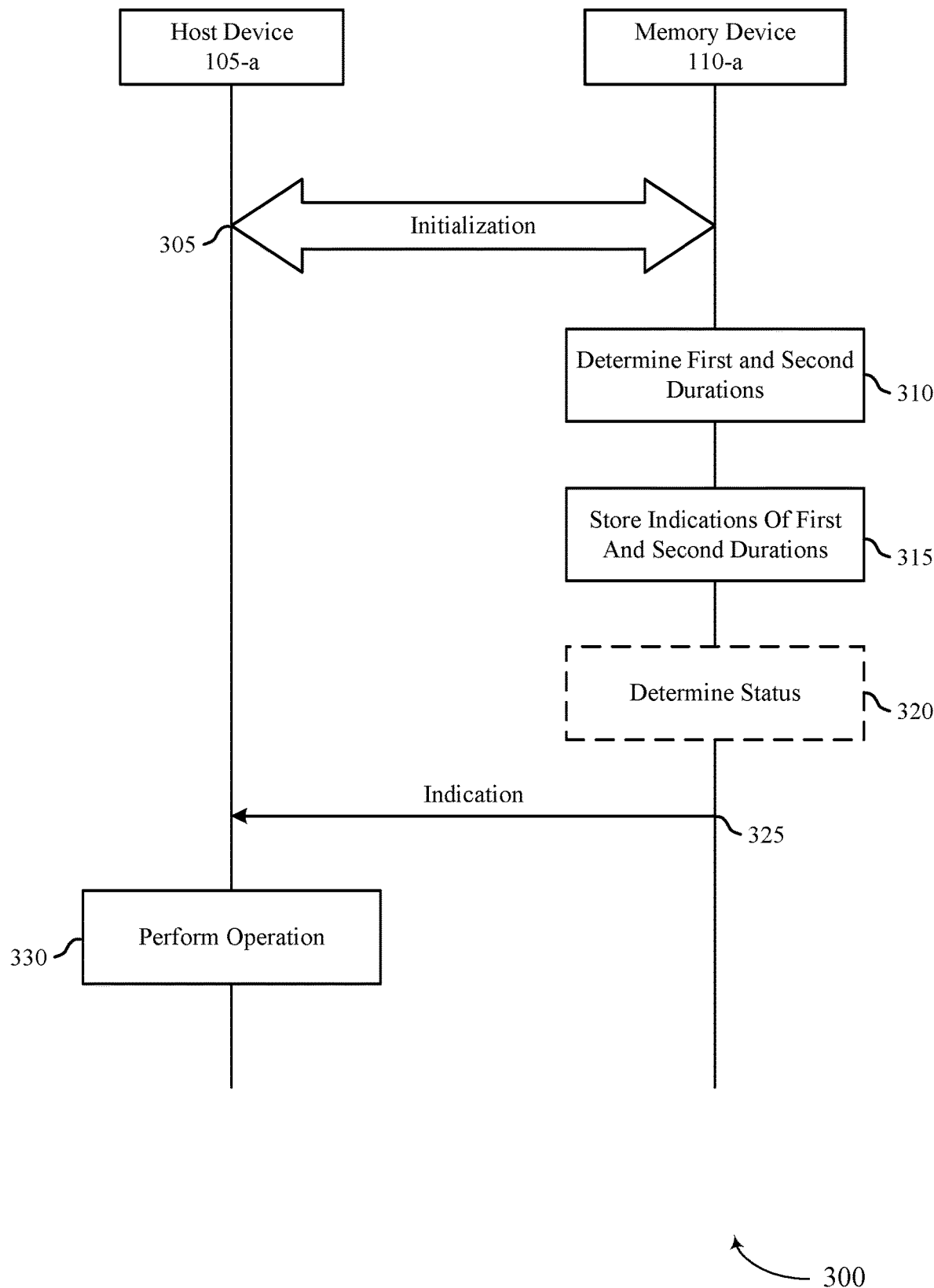
FIG. 3 illustrates an example of a process flow that supports temperature monitoring for memory devices in accordance with examples as disclosed herein.

FIG. 3 illustrates an example of a process flow 300 that supports temperature monitoring for memory devices in accordance with examples as disclosed herein. The process flow 300 includes a host device 105-a and a memory device 110-a, which may be examples of a host device 105 and a memory device 110 described with reference to FIG. 1. The host device 105-a and the memory device 110-a may be coupled or couplable via a physical or logical interface, such as one or more channels 115, that may support signaling between the respective devices. The memory device 110-a may illustrate an example of an apparatus that includes an array of memory cells 205 couplable to an interface with a processor or SoC of the host device 105-a. The array of memory cells 205 may be configured to operate in response to commands from the processor, the SoC, or another component of the host device 105-a.

The memory device 110-a may include logic or circuitry (e.g., a monitoring circuit 156, one or more monitoring circuits 166, one or more monitoring circuits 261, or any combination thereof) that may be attached to a same substrate as the array of memory cells 205, and which may be configured to support operations described herein. In some examples, the array of memory cells 205 of the memory device 110-a may include volatile memory cells, and the memory device 110-a may further include a non-volatile storage component (e.g., one or more non-volatile memory cells, latches, fuses or anti-fuses) configured to store an indication of a duration of operating the array of memory cells 205 within a temperature range.

At 305, the host device 105-a and the memory device 110-a may perform an initialization procedure, which may include initializing operation of the memory device 110-a. In some examples, the initialization may include or refer to powering the memory device 110-a (e.g., a power cycle), which may include coupling or activating a power supply from the host device 105-a to the memory device 110-a (e.g., enabling or coupling a supply voltage with the memory device 110-a). In some examples, the initialization of 305 may include or refer to the memory device 110-a exiting an idle mode, which may occur in response to an explicit command by the host device 105-a for the memory device 110-*a* to exit the idle mode, or may be based on a determination by the memory device 110-*a* to exit the idle mode responsive to a condition or signaling from the host device 105-*a* (e.g., in response to a change in power supply or voltage supply, in response to an access command from the host device 105-*a*). In a vehicle application, for example, the initialization may refer to a key-on or other turn-on condition, though the initialization may additionally or alternatively refer to a general "use" of the memory device 110-*a*.

In some cases, the host device 105-*a* may transmit, to the memory device 110-*a*, a command or other communication indicating one or more temperature ranges for monitoring at the memory device 110-*a*. The host device 105-*a* may transmit the command or other communication during the initialization, or at another time (e.g., prior to or after the initialization). In some cases, the memory device 110-*a* may additionally or alternatively determine one or more temperature ranges for monitoring at the memory device 110-*a*. The memory device 110-*a* may determine the one or more temperature ranges during the initialization (e.g., as part of the initialization) or at another time.

The memory device 110-*a* may be configured with or may determine any quantity of temperature ranges or windows (e.g., any quantity of temperature windows may be defined). For example, the quantity of temperature ranges may be based on temperature data, or information to track and report, or both. The temperature ranges may include a first temperature range and a second temperature range (e.g., among other temperature ranges), which may also be based on the temperature data, or information to track and report, or both. The temperature ranges may include any size of temperature range, where the size of the temperature range may be based on the temperature data or information to track and report, as well as the quantity of temperature ranges. In one example, the first temperature range may include temperatures from −40 degrees Celsius (° C.) to 0° C. and the second temperature range may include temperatures from 0° C. to 25° C.

At 310, the memory device 110-*a* may determine a first duration of operating the memory device 110-*a* within the first temperature range and a second duration of operating the memory device 110-*a* within the second temperature range. The first temperature range and the second temperature range may be based on the command from the host device 105-*a* or may be based on the determination by the memory device 110-*a*, or any combination thereof. The memory device 110-*a* may determine the first duration and the second duration using monitoring circuitry or logic as described herein.

For example, the memory device 110-*a* may include one or more on-die temperature sensors or one or more temperature sensors attached to or coupled with the die or one or more components on or coupled with the die. The one or more temperature sensors may be included in or coupled with the monitoring circuitry or logic, such that an output from the one or more temperature sensors may be received by the monitoring circuitry or logic. The one or more temperature sensors may for example, output a sensed temperature in the form of an analog or digital signal, where the sensed temperature may fall within or correspond to one of the temperature ranges. For example, the output may correspond to one of the first temperature range or the second temperature range.

The monitoring circuitry or logic (e.g., or a portion thereof) may determine or identify a temperature range corresponding to the output of a temperature sensor of the one or more temperature sensors. The monitoring circuitry or logic may use the temperature range to determine a time duration spent in the temperature range, which may for example, correspond to the first duration or the second duration. In some cases, the memory device 110-*a* (e.g., the monitoring circuitry or logic) may include a counter for each temperature range that may be activated when the output is associated with the corresponding temperature range. The counter may be indicative of a time or duration associated with the corresponding temperature range. In some cases, the memory device 110-*a* (e.g., the monitoring circuitry or logic) may include one or more sensors for each temperature range that may be activated or signaled when the output is associated with the corresponding temperature range. The one or more sensors may change or adjust a sensor parameter (e.g., may degrade) in proportion to an amount of time the one or more sensors are signaled or activated, and the sensor parameter may therefore be indicative of a duration or time spent in the corresponding temperature range. Techniques for determine time durations (e.g., the first and second durations) are further described with reference to FIG. 4.

In some cases, determining the first and second durations may be based on the initialization of the memory device 110-*a*. For example, the memory device 110-*a* may count or accumulate a duration of operating within the first temperature range or the second temperature range (or both) after initializing, which may include a total duration since the initializing. In some examples, at 310, the memory device 110-*a* may determine a total duration of operating the memory device 110-*a* within the first temperature range or the second temperature range (or both), for example, after a first initializing operation of the memory device 110-*a* associated with a plurality of initializing operations (e.g., may determine a lifetime duration of operating within a temperature range over a set of initializations). For example, the memory device 110-*a* may determine a duration of operating in a temperature range since the initializing, and may add the determined duration to an accumulated duration corresponding to one or more previous initializations after the memory device 110-*a* was manufactured, or installed in a product or assembly, or physically coupled with (e.g., directly or indirectly to) the host device 105-*a*.

In some examples, a duration determined by the memory device 110-*a* may be associated with a detection of one or more exploit conditions or other adverse operation or command of the memory device 110-*a*. For example, the memory device 110-*a* may determine one or more conditions indicative of an exploit of the memory device 110-*a* (e.g., a temperature higher than a threshold temperature), and may determine a duration associated with the exploit of the memory device 110-*a*. In various examples, determining a duration of an exploit or other adverse access of the memory device 110-*a* may or may not accompany a separate determination of an overall duration of the memory device 110-*a*, or a duration over which a temperature satisfies a threshold. For example, exploit monitoring may be auxiliary to other duration monitoring.

At 315, the memory device 110-*a* may store an indication of the first duration and an indication of the second duration (e.g., among indications of other durations). The indications may be stored in a non-volatile storage component associated with the memory device 110-*a* (e.g., external to the host device 105-*a*). The non-volatile storage component may be coupled with the memory device 110-*a* (e.g., and may be external to the memory device 110-*a*) or may be attached to a same substrate as a memory array 170 or memory die 160 of the memory device 110-*a*. The non-volatile storage component may be coupled with or selectively couplable with the monitoring logic or circuitry for reception of the indications.

In various examples, the non-volatile storage component for storing the indications may be separate from an array of volatile memory cells 205, or may be a portion of a memory array that normally operates in a volatile mode (e.g., operating a normally volatile memory cell 205 in a manner that leverages some degree of non-volatility). In some examples, the memory device 110-*a* may include a memory array 170 of non-volatile memory cells 205, and the storing of the indications may use a portion of such a memory array 170.

In some cases, the memory device 110-*a* may periodically store indications of the first duration and the second duration (e.g., among indications of other durations) to a volatile storage component, such as a dedicated register space (e.g., a register or a mode register) associated with the memory device 110-*a*. Such indications may represent durations from a most recent power cycle (e.g., because the dedicated register space may be empty or null when the memory device 110-*a* is powered down). In such cases, the memory device 110-*a* may periodically add the first duration to a first lifetime duration associated with operating the memory device 110-*a* within the first temperature range and may periodically add the second duration to a second lifetime duration associated with operating the memory device 110-*a* within the second temperature range. The memory device 110-*a* may additionally add one or more other durations to one or more other lifetime durations of corresponding temperature ranges. The lifetime durations may for example, be stored using the non-volatile storage component (e.g., such that the lifetime durations may be maintained during device power down), and in some cases, may represent the indications of the first and second durations.

In some examples, the memory device 110-*a* may store an exploit or other indicator associated with an indication of a duration of operating the memory device in conditions indicative of an exploit or other adverse accessing or command of the memory device 110-*a*. In some examples, the memory device 110-*a* may have access to a date or other relevant timestamp (e.g., by way of active signaling of the host device 105-*a*, by way of polling by the memory device 110-*a*), and the memory device 110-*a* may store a timestamp associated with the indications, or a timestamp associated with an exploit or other adverse accessing or command, or a timestamp associated with operating under various conditions (e.g., extreme conditions), among other timestamp indications.

In some examples, the memory device 110-*a* may additionally or alternatively be configured for tracking or identifying an immediate or instantaneous violation of an operating condition, such an excessive temperature condition. In some examples, the memory device 110-*a* may store (e.g., in a non-volatile storage component) an indication of an instance of such a violation by setting a flag (e.g., indicating a presence of such a violation), or incrementing a counter of operating condition violations (e.g., tracking a quantity of such violations), among other techniques, which may or may not be associated with or otherwise correspond to a stored duration of such a violation.

At 320, the memory device 110-*a* may in some cases, determine a status of the memory device 110-*a* based on the first duration, the second duration, or any combination thereof (e.g., among other durations). For example, the memory device 110-*a* may determine a health status of the memory device 110-*a* based on the first duration, the second duration, or any combination thereof. The health status may in some cases, represent an amount of usage (e.g., an amount of time, such as hours) remaining for the memory device 110-*a*. The health status may be determined, for example, by combining information from different sensors of the memory device 110-*a*. For example, information from temperature sensors and other sensors, or information from temperature sensors and operating mode information, may be used together to determine a health status of the memory device 110-*a*. In some cases, information from temperature sensors and other information may be plotted or configured on a grid (e.g., a grid of sensors), and a location on the grid (e.g., based on the temperature and other information) may indicate a health status of the memory device 110-*a*.

In some cases, determining the status of the memory device may include indicating a flag (e.g., to the host device 105-*a*) that the memory device 110-*a* or a portion thereof (e.g., a component of the memory device 110-*a*) has satisfied a threshold amount of time in a temperature range that may correlate to a reduced device lifetime. For example, the flag may indicate or be based on the memory device 110-*a* (e.g., or a portion thereof) spending 40 percent of its lifetime above 90° C. In another example, the memory device 110-*a* may indicate a flag if a temperature of the memory device goes beyond a threshold temperature (e.g., a specified temperature), such as below −40° C. In some cases, the flag may indicate that a deterioration of the memory device 110-*a* is accelerating or increasing.

At 325, the memory device 110-*a* may communicate, to the host device 105-*a*, an indication of operating the memory device 110-*a* within the first temperature range or the second temperature range (or both). In some cases, the memory device 110-*a* may transmit the indication to the host device 105-*a*, such as using a periodic transmission (e.g., according to a signaling interval) or using a transmission that is triggered by another condition at the memory device 110-*a* (e.g., an operating mode transition or a temperature threshold condition being met). In some cases, the memory device 110-*a* may store the indication, or information associated with the indication, at the volatile storage component (e.g., register) or the non-volatile storage component described herein, and the host device 105-*a* may access or poll the volatile storage component or the non-volatile storage component to receive the indication (e.g., to read the indication).

For example, the host device 105-*a* may read the first or second duration (or both) associated with the current power cycle from the volatile storage component or may read the first or second lifetime duration (or both) from the non-volatile storage component. In some cases, a readout method for the host device 105-*a* may be limited to some users of the host device 105-*a*, the memory device 110-*a*, or any combination thereof. For example, the host device 105-*a* may access the volatile storage component using one or more hidden register addresses or may access the volatile storage component or non-volatile storage component using guard keys.

The indication may include an indication of the first duration, the second duration, the first lifetime duration, the second lifetime duration, or any combination thereof (e.g., among other durations). The indication may also include an indication of the flag or the status of the memory device 110-*a*, if such information is determined by the memory device 110-*a* (e.g., as determined at 320).

In some cases, based on a stored indication of one or more durations, the memory device 110-*a* may determine that an inferred or detected degradation may satisfy a threshold, or may determine an estimate of remaining life expectancy, and the indication may include an indication that the memory device 110-*a* should be replaced, should be operated at a reduced rate or capacity, should be operated in a different mode, or may include another indication associated with a stored duration of operating the memory device 110-*a* within a temperature range. In other examples, the host device 105-*a* may perform such calculations, comparisons, or determinations about the status or health of the memory device 110-*a*.

At 330, the host device 105-*a* may perform an operation based on the received indication (e.g., based on receiving a status of the memory device 110-*a* or based on receiving the indication of one or more durations that the memory device 110-*a* has been operated in one or more temperature ranges). In some examples, at 325, the host device 105-*a* may transmit or signal an indication of a status of the memory device 110-*a* to another device, or to a user of the host device. For example, the host device 105-*a* may provide or initiate an indication to a user that the memory device 110-*a* may be degraded or should be replaced (e.g., as a repair or maintenance indicator).

The host device 105-*a* may in some cases, use information in or associated with the indication to determine a health status of the memory device 110-*a* or determine an amount of usage remaining for the memory device 110-*a*.

In some examples, the host device 105-*a* may provide information, such as an indication of the first or second durations (or both) (e.g., among other durations), or an indication that the first or second duration (or both) exceeds a threshold (e.g., a threshold related to life expectancy of the memory device 110-*a*) to a servicing entity or a manufacturer (e.g., an original equipment manufacturer (OEM) of the memory device 110-*a*, or the host device 105-*a*, or a system that includes the memory device 110-*a* and the host device 105-*a*). Such indications may include periodic indications, triggered indications (e.g., upon an operating duration satisfying a threshold), polled or requested indications, or various combinations thereof. In some examples, such indications may be coded or encrypted by the host device 105-*a*.

Such information may support a servicing entity or manufacturer analyzing statistical distributions of usage or operational characteristics of memory devices 110, or analyzing wear-out or degradation mechanisms and related life expectancy metrics, among other benefits. For example, a servicing entity or manufacturer may use the information to prevent failure of mission critical systems (e.g., mission critical systems using a failing memory device 110) by replacing the memory device 110-*a* or restricting usage of memory device 110-*a* based on one or more lifetime or usage metrics indicated by or obtained using the information (e.g., indicating a reduced lifetime, such as based on a status or flag). The servicing entity or manufacturer may additionally or alternatively update a thermal model or design for memory devices 110 or host devices 105 (or both) (e.g., or a system thereof) based on the information.

In some examples, at 330, the host device 105-*a* may change a parameter for operating the memory device 110-*a*, which may include changing a parameter at the host device 105-*a* used in the access or operation of the memory device 110-*a*, or commanding or requesting (e.g., using a command signal to the memory device 110-*a*) a change to a parameter at the memory device 110-*a* that is used in the access or operation of the memory device 110-*a*, or a combination thereof. Changing a parameter for accessing or operating the memory device 110-*a* may include changing (e.g., reducing) a rate of accessing the memory device 110-*a*, modifying a voltage supplied to the memory device 110-*a*, changing a priority, reliability, or information class associated with the memory device 110-*a* (e.g., refraining from using the memory device 110-*a* for mission critical information or safety systems, using the memory device 110-*a* for non-mission-critical information such as media systems), or refraining from using the memory device 110-*a*, or portion thereof, altogether (e.g., determining to use a different memory device 110, determining to use a different portion of the memory device 110-*a*).

Although the techniques illustrated by the process flow 300 refer to operations of and signaling between a host device 105-*a* and a memory device 110-*a*, in some examples, the described operations and signaling may be performed between a host device 105 and one or more memory dies 200. For example, each memory die 200 of a set of one or more memory dies of a memory device 110 may determine a respective operating duration within one or more temperature ranges, and store an indication of the operating duration(s) respective to each memory die 200 (e.g., using a non-volatile storage component of each memory die 200, using a combined non-volatile storage component of the memory device 110, such as a non-volatile storage component of a device memory controller 155).

In some examples, a device-level status indication may be communicated to the host device 105, which may indicate a minimum, average, maximum, or otherwise processed aggregation of the respective operating durations of the memory dies 200 of the memory device 110. In some examples, a respective die-level indication for each memory die 200 may be communicated to the host device 105, which may support the host device 105 indicating a quantity or specific memory dies 200 having potential degradation above a threshold (e.g., to a user, in a maintenance indication), selecting respective memory dies 200 for certain access operations (e.g., prioritizing operations on certain memory dies 200 according to indicated operating durations), or modifying operating parameters for respective memory dies 200, among other responsive operation, based on the die-level indications of operating durations.

In some examples, the described techniques for operational monitoring at a memory device 110 or memory die 200 may not include the indication of 325, or may support further monitoring functionality in addition to the status indication of 325. For example, stored indications of operating durations may be polled or requested in diagnostic or maintenance operations that are different from the operations of a host device 105 to support, for example, field data analysis, routine or preventative maintenance performed on the host device 105-*a* or memory device 110-*a* (or both). In a vehicle application, for example, indications of an operating duration stored at a memory device 110, or related indications (e.g., status indications of 320) passed to an integrated controller by a memory device 110, may be polled by a diagnostic tool via an on-board diagnostics (OBD) connector or other diagnostic interface of the vehicle, to evaluate whether a memory device 110, or a combination of a host device 105 and a memory device 110 (e.g., an integrated vehicle controller including a processor and memory array), should be replaced.

Figure 4:
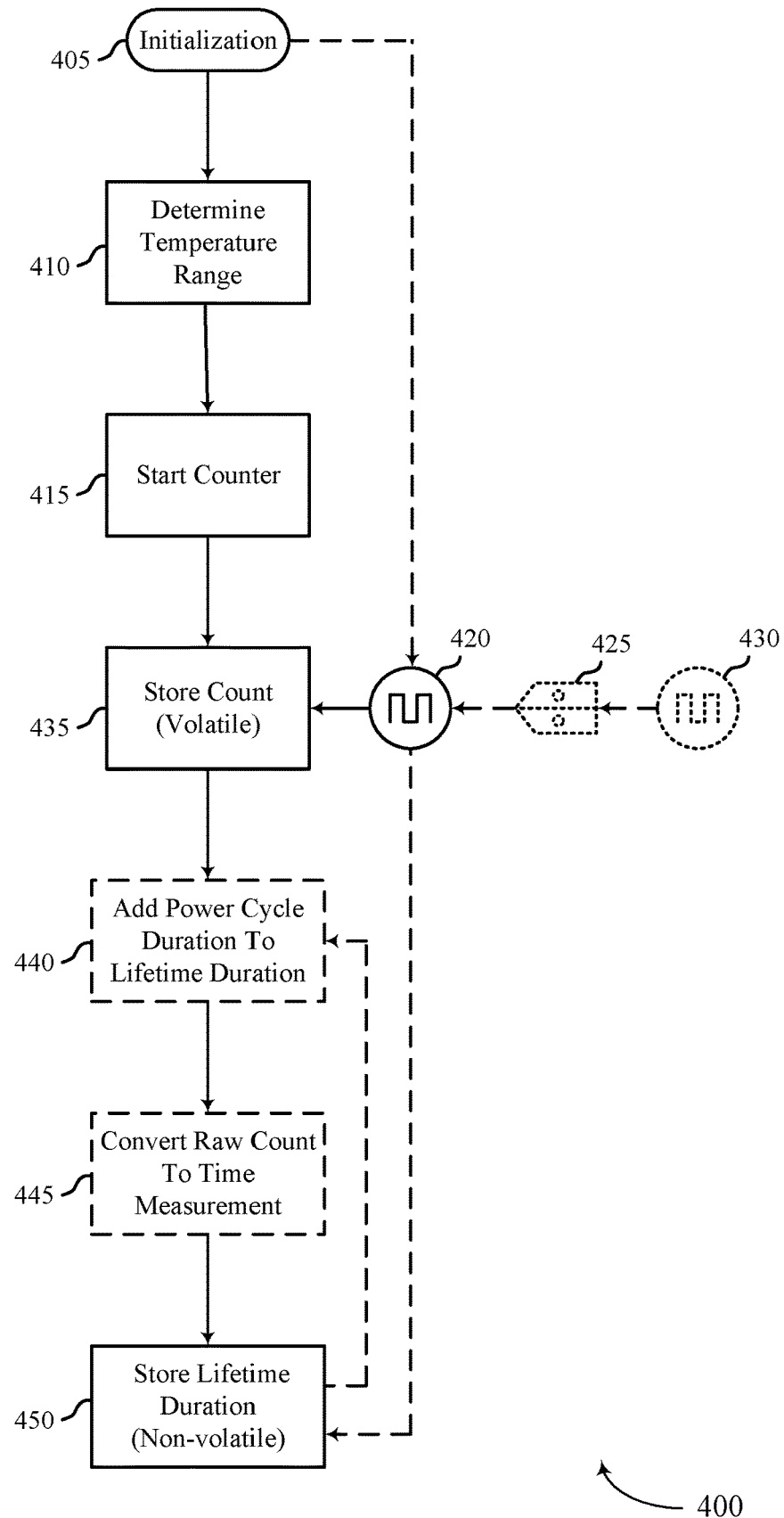
FIG. 4 illustrates an example of a monitoring architecture that supports temperature monitoring for memory devices in accordance with examples as disclosed herein.

FIG. 4 illustrates an example of a monitoring architecture 400 that supports temperature monitoring for memory devices in accordance with examples as disclosed herein. In various examples, the monitoring architecture 400 may illustrate operations and components (e.g., logic or circuitry components to perform or support the described operations) of a memory device 110, or one or more memory dies 160 of a memory device 110.

At 405, the memory device 110 or memory die 160 may perform an initialization. The operations of 405 may be an example of the operations of 305 described with reference to process flow 300. For example, the initialization of 405 may include or refer to a power-on event, a power cycle, a key-on event in a vehicle application, an exit from an idle mode, or other aspects of an initialization of the memory device 110 or memory die 160. In some examples, the initialization of 405 may include or be accompanied by initializing or powering a signal source, such as a clock signal source 420.

At 410, the memory device 110 or memory die 160 may receive an output from a temperature sensor of the memory device 110 or memory die 160 and may determine a temperature range corresponding to the output. For example, the memory device 110 or memory die 160 may include logic or circuitry (e.g., monitoring logic or circuitry) for receiving the output and determining the corresponding temperature range. The logic or circuitry may determine, for example, whether the output corresponds to a first temperature range or a second temperature range (e.g., among other temperature ranges).

At 415, the memory device 110 or memory die 160 may start a counter. For example, when tracking a duration (e.g., a duration at or within the temperature range) based on a clock or other oscillating signal, the operations of 415 may include initializing or zeroing a counter that counts transitions of the oscillating signal, or coupling a counter with an oscillating signal source (e.g., clock signal source 420). The counter may be specific to or associated with the temperature range, and the memory device 110 or memory die 160 may include one or more counters for each temperature range tracked by the memory device 110 or memory die 160.

Additionally or alternatively, a duration for the temperature range may be tracked by way of aging or degrading components or sensors (e.g., switches, transistors, gates) according to a known or predicted degradation profile. For example, a clock signal source 420 may be coupled with a switching component or other component that is associated with the determined temperature range. The transitions of the switching component or other component in response to the signal from the clock signal source 420 may cause a degradation over time by way of negative-bias temperature instability (NBTI), non-conducting stress (NCS), hot carrier, or other degradation mechanism. The memory device or memory die 160 may include one or more degrading components for each temperature range, and may signal or activate the one or more degrading components based on determining the corresponding temperature range at 410.

A component that is intentionally degraded by way of a configured degradation mechanism may support an inference of a duration within the temperature range, in some cases, without storing an explicit indication of a quantity of counts or other duration. Such a switching component may be polled or probed periodically to determine the duration of operating the memory device 110 or memory die 160 within the corresponding temperature range.

At 435, the memory device 110 or memory die 160 may store a count (e.g., a counter value). For example, based at least in part on starting the counter at 415, the counter may accumulate a count of signal transitions (e.g., high-to-low transitions, low-to-high transitions) of an oscillating signal. The stored count may refer to a raw count or running count since the initialization of 405 (e.g., a count since power-on, a quantity of counts of other indication of a length of time during a power cycle). In some examples, the stored count may refer to a count that is stored or accumulated in a volatile storage component of the memory device 110 or memory dies 160, such as one or more volatile memory cells, volatile registers, or volatile latches. In some examples, the stored count may be provided for other monitoring functions, which may be internal to the memory device 110 or memory die 160.

The stored count may be based on an oscillating signal received from a clock signal source 420. The clock signal source 420 may refer to an oscillator of the memory device 110 or the memory die 160, or may refer to a component that converts, receives, or otherwise processes an oscillating signal from another component or device. In some examples, the clock signal source 420 may refer to a self-refresh oscillator of the memory device 110 or the memory die 160.

In some examples, an oscillator of the memory device 110 or memory die 160 may have a frequency of oscillation that is different than (e.g., higher than) desired for the temperature monitoring operations described herein. For example, temperature monitoring may not be based on a resolution or a granularity according to a self-refresh oscillator of the memory device 110 or memory die 160, and counting at such a rate may involve more storage elements (e.g., volatile memory cells or latches) than desirable. Thus, the memory device 110 or memory die 160 may in some cases, include a clock divider 425 that provides, to the clock signal source 420, an oscillating signal having a frequency that is some fraction of the frequency of a base clock signal source 430.

The base clock signal source 430, the clock divider 425, and the clock signal source 420 may illustrate an example for receiving a first clock signal from an oscillator of the memory device, the first clock signal having a first frequency, and generating a second clock signal based at least in part on the first clock signal, the second clock signal having a second frequency that is lower than the first frequency. Accordingly, the operations of 435 may include counting a quantity of cycles of the second clock signal, which may support determining a duration of operating the memory device 110 or memory die 160 within the temperature range based on the quantity of cycles of the second clock signal.

In some examples, the base clock signal source 430 may include or refer to a self-refresh oscillator of the memory device 110 or memory die 160, and the clock divider 425 may provide a signal having a frequency that is a fraction of the self-refresh oscillator (e.g., according to a 10:1 ratio, according to a 100:1 ratio, or any other ratio). The clock divider 425 may be specific to or dedicated to the determination of operating durations or other aspects of health monitoring as described herein, and the base clock signal source 430 may be used for other operations without the scaling performed by the clock divider 425.

In some examples, the clock divider 425, or another processing or conversion component, may support the scaling of a clock rate or signal frequency based at least in part on an operating condition of the memory device 110 or memory die 160. For example, such a clock divider or conversion component may have a first frequency ratio at a first temperature or first temperature range and a second, different frequency ratio at a second temperature or second temperature range. In some examples, a clock signal source 420, or a base clock signal source 430, or a combination thereof may support a clock rate itself that is based at least in part on an operating condition, such as a clock rate that is proportional or inversely proportional to temperature or a temperature range.

Such techniques may enable the memory device 110 or memory die 160 to accelerate or decelerate counts at 435

(e.g., scaling counts of the base clock signal source 430), which may support an "effective" count or duration accumulation to account for operating conditions that may accelerate or decelerate aging or degradation of the memory device 110 or memory die 160. In some examples, indications related to acceleration of clock signal sources, clock signal dividers, or health monitoring counters (e.g., associated with accelerated degradation of a memory device 110) may be provided to a host device 105, which may support the host device 105 selectively operating a memory device 110 in a manner that considers degradation rate of the memory device (e.g., adjusting operating parameters based on receiving an indication of accelerated or decelerated degradation).

Additionally or alternatively, at 435, the memory device 110 or memory die 160 may determine a duration within the temperature range based on a component that is intentionally degraded. For example, the memory device 110 or memory die 160 may determine an amount of degradation of the component (e.g., may read the component) and may determine the duration based on a correlation between the amount of degradation and an amount or duration of time. In some cases, such components may represent sensors, which may further be or include non-volatile information associated with the duration of operating the memory device 110 or memory die 160 within a corresponding temperature range.

In various examples, the operations of 435 may be performed periodically (e.g., according to an update interval, according to a clock rate), or event-driven (e.g., initiated by a quantity of counts satisfying a threshold, initiated upon a change in operating mode of the memory device 110 or memory die 160, upon entering an idle mode, upon completion of a power cycle).

In some examples, at 440, the memory device 110 or memory die 160 may add a duration of operating within the temperature range (e.g., a stored count or determined duration) to a lifetime duration of operating within the temperature range. For example, a duration of operating within the temperature range over the lifetime of the memory device 110 or memory die 160, which may refer to a count or duration stored in a non-volatile storage component of the memory device 110 or memory die 160 (e.g., prior to the initialization of 405), may be added to the count being accumulated since the initialization of 405. In some examples, such a duration may refer to an instantaneous duration of operating the memory device 110 or memory die 160 within the temperature range that is being actively updated (e.g., according to a clock signal source 420, in comparison to a count or duration stored in a non-volatile storage component, which may or may not be actively updated). In some examples, an instantaneous duration determined may be provided for other monitoring functions, which may be internal to the memory device 110 or memory die 160. In some examples, the operations of 440 may be omitted.

In some examples, at 445, the memory device 110 or memory die 160 may convert a raw count (e.g., a stored count or a duration) to a time measurement. For example, a quantity of counts may be converted to a time unit that includes a quantity of seconds, minutes, hours, days, or a combination thereof. The operations of 445 may be an example of converting a quantity of cycles or counts into a duration measured in a time unit, such that storing an indication of a duration of operating the memory device 110 or memory die 160 within the temperature range may include storing an indication having the time unit. In some examples, the operations of 445 may be omitted, such that a stored indication remains in units of counts (e.g., of transitions of the clock signal source 420). In some examples, the operations of 445 may be performed when determining a duration based on a degradation of a sensor or component associated with the temperature range.

At 450, the memory device 110 or memory die 160 may store an indication of a lifetime duration of operating the memory device 110 or memory die 160 within the temperature range. The storage operations of 450 may be referred to as writing a raw lifetime duration of operating within the temperature range, writing a total time (e.g., quantity of hours, quantity of minutes) of operation of the memory device 110 or memory die 160 within the temperature range, or other descriptions.

In various examples, the operations of 450 may be performed periodically (e.g., according to an update interval, according to a clock rate), or event-driven (e.g., initiated by a quantity of counts satisfying a threshold, initiated upon a change in operating mode of the memory device 110 or memory die 160, upon entering an idle mode, upon completion of a power cycle). For example, when a previously-determined duration or count (e.g., a duration or count prior to the initialization of 405) has been included in an instantaneous or otherwise actively updated count or duration, which may be supported by the operations of 440, such a value may be committed to non-volatile storage at 450. In some examples, a stored count (e.g., as determined or stored at 435, which may or may not include a conversion of 445) may be added to a previously-determined duration or count as part of the operations of 450, which may be initiated in accordance with the operations of 450. In some examples, the storage operations of 450 may be ongoing, such as when a count of transitions of the clock signal source 420 are added directly to the value stored in non-volatile storage.

In some examples, a stored count itself (e.g., a count or duration since the initialization of 405, as determined or stored at 435, which may or may not include a conversion of 445) may be committed to an instance of non-volatile storage of the memory device 110 or memory die 160, supporting the memory device 110 or memory die 160 recording a log of counts or duration per power cycle. In some examples, such a log of counts or durations may be separately added together to determine an overall duration for operating the memory device 110 or memory die 160 within the temperature range. Additionally or alternatively, such an approach may support performing other evaluations that may rely on an understanding of a quantity of power cycles, or a distribution of durations over a set of power cycles.

The storage at 450 may be performed using various examples of non-volatile storage at a memory device 110 or a memory die 160. For example, the non-volatile storage may refer to or include non-volatile memory cells of a memory array (e.g., of an memory array 170) or other memory cells or storage components associated with control circuitry or logic of a memory device 110 or a memory die 160 (e.g., of a device memory controller 155, of a local memory controller 165). In some examples, the non-volatile storage component may refer to or include a storage element of a material-based storage architecture (e.g., a chalcogenide memory cell), a transistor-based storage architecture (e.g., a not-AND (NAND) or flash memory cell), or a non-volatile latch. In some examples, the non-volatile storage component may refer to or include a one-time programmable storage element, such as a fuse or anti-fuse. In some examples, the storage of 450 may refer to writing a duration or quantity of counts to a register of the memory device 110 or memory die 160, such as a mode register, which may be polled by a host device 105.

Figure 5:
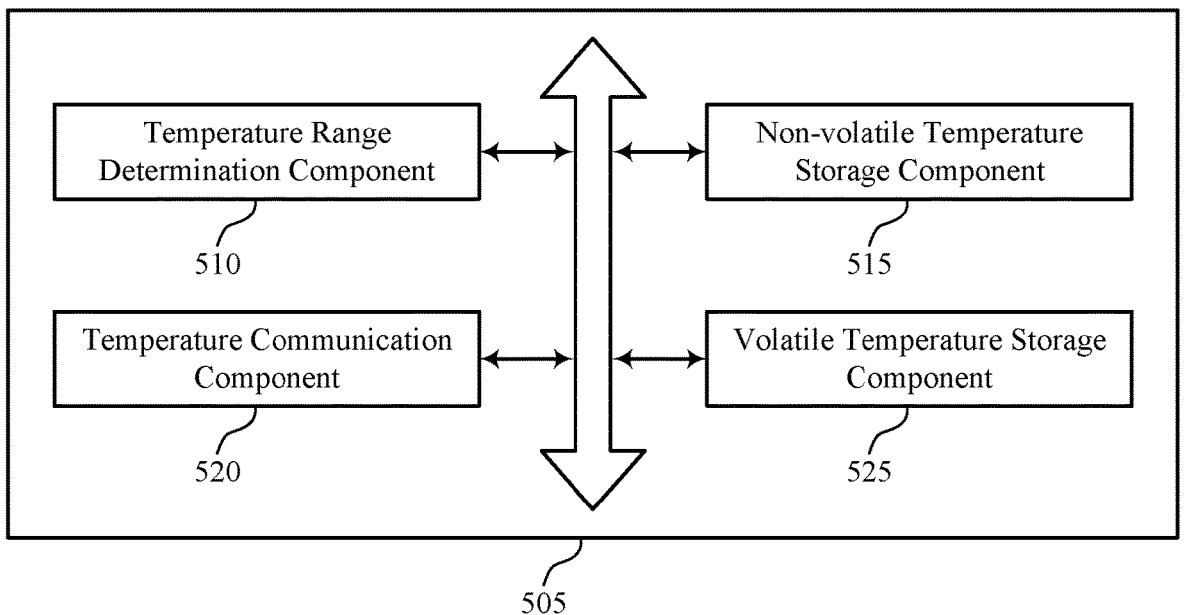
FIG. 5 shows a block diagram of a memory device that supports temperature monitoring for memory devices in accordance with examples as disclosed herein.

FIG. 5 shows a block diagram 500 of a memory device 505 that supports temperature monitoring for memory devices in accordance with examples as disclosed herein. The memory device 505 may be an example of aspects of a memory device as described with reference to FIGS. 1-4. The memory device 505 may include a temperature range determination component 510, a non-volatile temperature storage component 515, a temperature communication component 520, and a volatile temperature storage component 525. Each of these modules may communicate, directly or indirectly, with one another (e.g., via one or more buses).

The temperature range determination component 510 may determine, at a memory device, a first duration of operating the memory device within a first temperature range and a second duration of operating the memory device within a second temperature range. In some examples, the temperature range determination component 510 may receive a command indicating one or more of the first temperature range or the second temperature range, where the first duration and the second duration are determined based on the command.

In some examples, the temperature range determination component 510 may receive, at logic of the memory device, an output from a temperature sensor of the memory device, where determining the first duration and the second duration includes determining, at the logic, whether the output corresponds to the first temperature range or the second temperature range, where storing one or more of the indication of the first duration or the indication of the second duration is based on determining whether the output corresponds to the first temperature range or the second temperature range.

In some examples, the temperature range determination component 510 may increment one or more of a counter for the first temperature range or a counter for the second temperature range based on determining whether the output corresponds to the first temperature range or the second temperature range, the counter for the first temperature range indicative of the first duration and the counter for the second temperature range indicative of the second duration.

In some examples, the temperature range determination component 510 may signal one or more of a first sensor or a second sensor of the memory device based on determining whether the output corresponds to the first temperature range or the second temperature range, the first sensor associated with the first temperature range and the second sensor associated with the second temperature range, where determining the first duration and the second duration further includes determining, based on signaling to the respective first sensor and second sensor, the first duration based on a first degradation level of the first sensor and the second duration based on a second degradation level of the second sensor.

The non-volatile temperature storage component 515 may store, at a non-volatile storage component associated with the memory device, an indication of the first duration and an indication of the second duration. In some cases, the memory device includes the non-volatile storage component. In some cases, the non-volatile storage component is coupled with the memory device.

The temperature communication component 520 may communicate, to a host device coupled with the memory device, an indication of operating the memory device within one or more of the first temperature range or the second temperature range based on storing the indication of the first duration and the indication of the second duration. In some examples, the temperature communication component 520 may write the indication of operating the memory device within one or more of the first temperature range or the second temperature range at a register of the memory device, the register configured to be accessed by the host device.

In some examples, the temperature communication component 520 may store the indication of operating the memory device within one or more of the first temperature range or the second temperature range at the non-volatile storage component, the non-volatile storage component configured to be accessed by the host device. In some examples, the temperature communication component 520 may communicate a status of the memory device, the status determined based on storing the indication of the first duration and the indication of the second duration. In some cases, the indication of operating the memory device within one or more of the first temperature range or the second temperature range includes the indication of the first duration and the indication of the second duration.

The volatile temperature storage component 525 may write the indication of the first duration and the indication of the second duration at a volatile storage component of the memory device before storing the indication of the first duration and the indication of the second duration at the non-volatile storage component. In some cases, the volatile storage component includes a register of the memory device.

Figure 6:
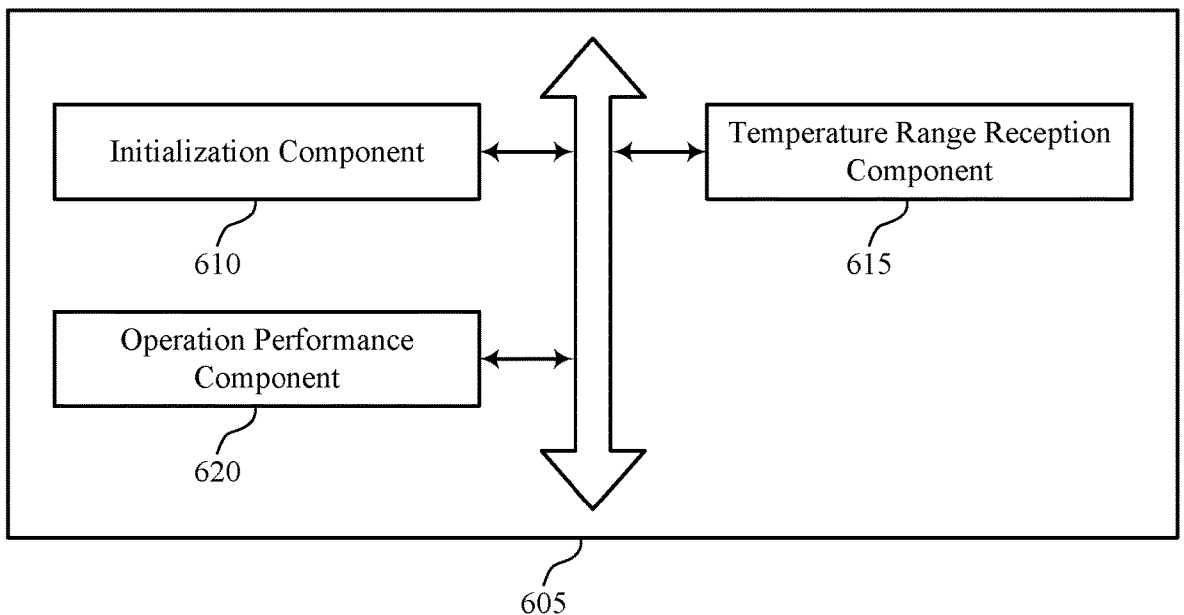
FIG. 6 shows a block diagram of a host device that supports temperature monitoring for memory devices in accordance with examples as disclosed herein.

FIG. 6 shows a block diagram 600 of a host device 605 that supports temperature monitoring for memory devices in accordance with examples as disclosed herein. The host device 605 may be an example of aspects of a host device as described with reference to FIGS. 1-4. The host device 605 may include an initialization component 610, a temperature range reception component 615, and an operation performance component 620. Each of these modules may communicate, directly or indirectly, with one another (e.g., via one or more buses).

The initialization component 610 may initialize, by a host device, operation of a memory device. The temperature range reception component 615 may receive, from the memory device and based on the initializing, an indication of operating the memory device within one or more of a first temperature range for a first duration or a second temperature range for a second duration. In some examples, the temperature range reception component 615 may receive an indication of a status of the memory device, the status based on operating the memory device within one or more of the first temperature range for the first duration or the second temperature range for the second duration. In some examples, the temperature range reception component 615 may access the indication at a non-volatile storage component associated with the memory device. In some examples, the temperature range reception component 615 may access the indication at a register of the memory device.

The operation performance component 620 may perform an operation based on receiving the indication. In some examples, the operation performance component 620 may determine a health status of the memory device based on the indication, determining an amount of usage left for the memory device based on the indication, communicating, with one or more other devices, information associated with the indication, or any combination thereof.

Figure 7:
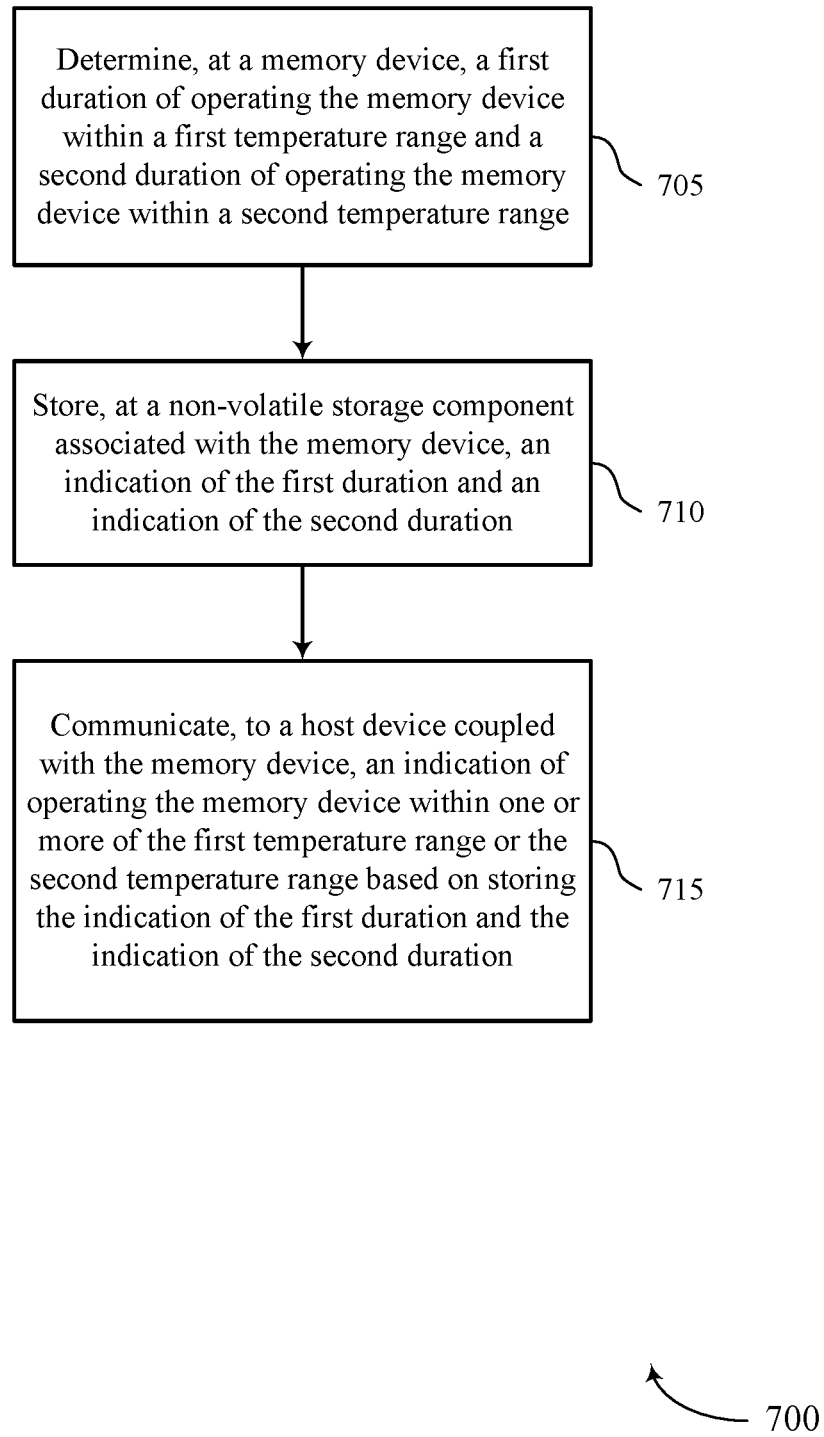
FIGS. 7 and 8 show flowcharts illustrating a method or methods that support temperature monitoring for memory devices in accordance with examples as disclosed herein.

FIG. 7 shows a flowchart illustrating a method or methods 700 that supports temperature monitoring for memory devices in accordance with examples as disclosed herein. The operations of method 700 may be implemented by a memory device or its components as described herein. For example, the operations of method 700 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 705, the memory device may determine a first duration of operating the memory device within a first temperature range and a second duration of operating the memory device within a second temperature range. The operations of 705 may be performed according to the methods described with reference to FIGS. 3 and 4. In some examples, aspects of the operations of 705 may be performed by a temperature range determination component as described with reference to FIG. 5.

At 710, the memory device may store, at a non-volatile storage component associated with the memory device, an indication of the first duration and an indication of the second duration. The operations of 710 may be performed according to the methods described with reference to FIGS. 3 and 4. In some examples, aspects of the operations of 710 may be performed by a non-volatile temperature storage component as described with reference to FIG. 5.

At 715, the memory device may communicate, to a host device coupled with the memory device, an indication of operating the memory device within one or more of the first temperature range or the second temperature range based on storing the indication of the first duration and the indication of the second duration. The operations of 715 may be performed according to the methods described with reference to FIG. 3. In some examples, aspects of the operations of 715 may be performed by a temperature communication component as described with reference to FIG. 5.

In some examples, an apparatus as described herein may perform a method or methods, such as the method 700. The apparatus may include features, means, or instructions (e.g., a non-transitory computer-readable medium storing instructions executable by a processor) for determining, at a memory device, a first duration of operating the memory device within a first temperature range and a second duration of operating the memory device within a second temperature range, storing, at a non-volatile storage component associated with the memory device, an indication of the first duration and an indication of the second duration, and communicating, to a host device coupled with the memory device, an indication of operating the memory device within one or more of the first temperature range or the second temperature range based on storing the indication of the first duration and the indication of the second duration.

Some examples of the method 700 and the apparatus described herein may further include operations, features, means, or instructions for writing the indication of the first duration and the indication of the second duration at a volatile storage component of the memory device before storing the indication of the first duration and the indication of the second duration at the non-volatile storage component.

In some examples of the method 700 and the apparatus described herein, the volatile storage component includes a register of the memory device.

In some examples of the method 700 and the apparatus described herein, communicating the indication of operating the memory device within one or more of the first temperature range or the second temperature range may include operations, features, means, or instructions for writing the indication of operating the memory device within one or more of the first temperature range or the second temperature range at a register of the memory device, the register configured to be accessed by the host device.

In some examples of the method 700 and the apparatus described herein, communicating the indication of operating the memory device within one or more of the first temperature range or the second temperature range may include operations, features, means, or instructions for storing the indication of operating the memory device within one or more of the first temperature range or the second temperature range at the non-volatile storage component, the non-volatile storage component configured to be accessed by the host device.

Some examples of the method 700 and the apparatus described herein may further include operations, features, means, or instructions for receiving a command indicating one or more of the first temperature range or the second temperature range, where the first duration and the second duration may be determined based on the command.

Some examples of the method 700 and the apparatus described herein may further include operations, features, means, or instructions for receiving, at logic of the memory device, an output from a temperature sensor of the memory device, where determining the first duration and the second duration includes determining, at the logic, whether the output corresponds to the first temperature range or the second temperature range, where storing one or more of the indication of the first duration or the indication of the second duration may be based on determining whether the output corresponds to the first temperature range or the second temperature range.

Some examples of the method 700 and the apparatus described herein may further include operations, features, means, or instructions for incrementing one or more of a counter for the first temperature range or a counter for the second temperature range based on determining whether the output corresponds to the first temperature range or the second temperature range, the counter for the first temperature range indicative of the first duration and the counter for the second temperature range indicative of the second duration.

Some examples of the method 700 and the apparatus described herein may further include operations, features, means, or instructions for signaling one or more of a first sensor or a second sensor of the memory device based on determining whether the output corresponds to the first temperature range or the second temperature range, the first sensor associated with the first temperature range and the second sensor associated with the second temperature range, where determining the first duration and the second duration further includes determining, based on signaling to the respective first sensor and second sensor, the first duration based on a first degradation level of the first sensor and the second duration based on a second degradation level of the second sensor.

In some examples of the method 700 and the apparatus described herein, the indication of operating the memory device within one or more of the first temperature range or the second temperature range includes the indication of the first duration and the indication of the second duration. In some examples of the method 700 and the apparatus described herein, the memory device includes the non-volatile storage component. In some examples of the method 700 and the apparatus described herein, the non-volatile storage component may be coupled with the memory device.

In some examples of the method 700 and the apparatus described herein, communicating the indication of operating the memory device within one or more of the first temperature range or the second temperature range may include operations, features, means, or instructions for communicating a status of the memory device, the status determined based on storing the indication of the first duration and the indication of the second duration.

Figure 8:
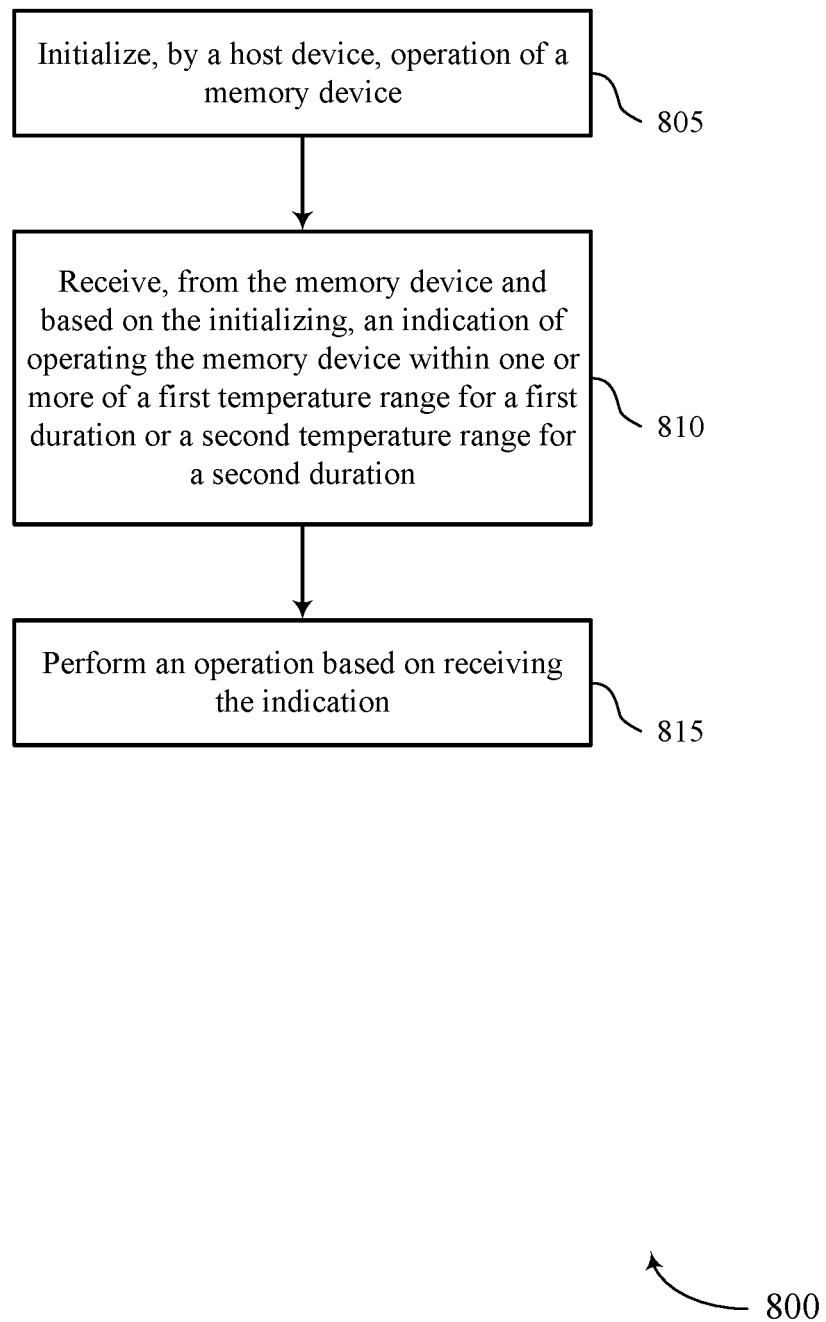

FIG. 8 shows a flowchart illustrating a method or methods 800 that supports temperature monitoring for memory devices in accordance with examples as disclosed herein. The operations of method 800 may be implemented by a host device or its components as described herein. For example, the operations of method 800 may be performed by a host device as described with reference to FIG. 6. In some examples, a host device may execute a set of instructions to control the functional elements of the host device to perform the described functions. Additionally or alternatively, a host device may perform aspects of the described functions using special-purpose hardware.

At 805, the host device may initialize operation of a memory device. The operations of 805 may be performed according to the methods described with reference to FIGS. 3 and 4. In some examples, aspects of the operations of 805 may be performed by an initialization component as described with reference to FIG. 6.

At 810, the host device may receive, from the memory device and based on the initializing, an indication of operating the memory device within one or more of a first temperature range for a first duration or a second temperature range for a second duration. The operations of 810 may be performed according to the methods described with reference to FIG. 3. In some examples, aspects of the operations of 810 may be performed by a temperature range reception component as described with reference to FIG. 6.

At 815, the host device may perform an operation based on receiving the indication. The operations of 815 may be performed according to the methods described with reference to FIG. 3. In some examples, aspects of the operations of 815 may be performed by an operation performance component as described with reference to FIG. 6.

In some examples, an apparatus as described herein may perform a method or methods, such as the method 800. The apparatus may include features, means, or instructions (e.g., a non-transitory computer-readable medium storing instructions executable by a processor) for initializing, by a host device, operation of a memory device, receiving, from the memory device and based on the initializing, an indication of operating the memory device within one or more of a first temperature range for a first duration or a second temperature range for a second duration, and performing an operation based on receiving the indication.

In some examples of the method 800 and the apparatus described herein, performing the operation may include operations, features, means, or instructions for determining a health status of the memory device based on the indication, determining an amount of usage left for the memory device based on the indication, communicating, with one or more other devices, information associated with the indication, or any combination thereof.

In some examples of the method 800 and the apparatus described herein, receiving the indication may include operations, features, means, or instructions for receiving an indication of a status of the memory device, the status based on operating the memory device within one or more of the first temperature range for the first duration or the second temperature range for the second duration.

In some examples of the method 800 and the apparatus described herein, receiving the indication may include operations, features, means, or instructions for accessing the indication at a non-volatile storage component associated with the memory device. In some examples of the method 800 and the apparatus described herein, receiving the indication may include operations, features, means, or instructions for accessing the indication at a register of the memory device.

It should be noted that the methods described herein describe possible implementations, and that the operations and the steps may be rearranged or otherwise modified and that other implementations are possible. Further, portions from two or more of the methods may be combined.

An apparatus is described. The apparatus may include an array of memory cells configured to be coupled with a host device and configured to operate in response to a command from the host device, logic attached to a same substrate as the array and configured to determine a first duration of operating the array within a first temperature range and a second duration of operating the array within a second temperature range, and a non-volatile storage component attached to the same substrate as the array and coupled with the logic, the non-volatile storage component configured to store an indication of the first duration and an indication of the second duration.

Some examples of the apparatus may include a volatile storage component attached to the same substrate as the array and coupled with the logic, the volatile storage component configured to store the indication of the first duration and the indication of the second duration. In some examples, the volatile storage component includes a register configured to be accessed by the host device to communicate an indication of operating the array within one or more of the first temperature range or the second temperature range. In some examples, the non-volatile storage component may be configured to be accessed by the host device to communicate an indication of operating the array within one or more of the first temperature range or the second temperature range.

Some examples of the apparatus may include a temperature sensor configured to output a temperature of the array to the logic, where the logic may be configured to determine whether the output temperature corresponds to the first temperature range or the second temperature range based on the output. In some examples, the logic may be further configured to increment one or more of a counter for the first temperature range or a counter for the second temperature range based on determining whether the output corresponds to the first temperature range or the second temperature range, the counter for the first temperature range indicative of the first duration and the counter for the second temperature range indicative of the second duration.

Some examples of the apparatus may include a first sensor associated with the first temperature range and a second sensor associated with the second temperature range, the first and second sensors each configured to receive signaling from the logic based on determining whether the output corresponds to the first temperature range or the second temperature range. The apparatus may also include second logic configured to determine the first duration based on a first degradation level of the first sensor and the second duration based on a second degradation level of the second sensor, the first degradation level and the second degradation level based on signaling to the respective first sensor and second sensor.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A memory device, comprising:
one or more memory arrays; and
one or more controllers coupled with the one or more memory arrays and configured to cause the memory device to:
receive, while the memory device operates over one or more power cycles, a plurality of temperatures from one or more temperature sensors of the memory device;
determine, for each temperature and a corresponding temperature range of a plurality of temperature ranges, each temperature range of the plurality of temperature ranges being associated with a respective counter of a plurality of counters, a corresponding time duration over the one or more power cycles that the memory device is operating within the corresponding temperature range by incrementing a respective counter of the plurality of counters associated with the corresponding temperature range by a value indicating the corresponding time duration, wherein incrementing the respective counter by the value comprises accumulating a count of signal transitions of an oscillating signal, the count corresponding to the value indicating the corresponding time duration;
scale a signal frequency of the oscillating signal based at least in part on the corresponding temperature range, wherein determining the corresponding time duration is based at least in part on the scaling; and
store the values associated with the plurality of counters at a storage component associated with the memory device.

2. The memory device of claim 1, wherein, to scale the signal frequency, the one or more controllers are further configured to cause the memory device to:
accelerate, or decelerate, the incrementing of the respective counter based at least in part on the corresponding temperature range, wherein the corresponding time duration comprises an effective time duration based at least in part on the acceleration or deceleration.

3. The memory device of claim 1, wherein the scaling is based at least in part on scaling a clock rate.

4. The memory device of claim 1, wherein the one or more controllers are further configured to cause the memory device to:
provide an indication of the scaling to a host device coupled with the memory device.

5. The memory device of claim 1, wherein the one or more controllers are further configured to cause the memory device to:
add the value to a first total value associated with the corresponding temperature range, wherein storing the values comprises storing a plurality of first total values after the adding, or add the value to a second total value stored at the storage component.

6. The memory device of claim 1, wherein the one or more controllers are further configured to cause the memory device to:
add, after storing the values, one or more values for each corresponding temperature range.

7. The memory device of claim 1, wherein storing the values is based at least in part on an updated interval, a clock rate, one or more quantities of values satisfying a threshold, a change in operating mode of the memory device, a change to an idle mode, a completion of a power cycle, or any combination thereof.

8. The memory device of claim 1, wherein the one or more controllers are further configured to cause the memory device to:
convert the value to a time measurement associated with to the corresponding time duration, wherein storing the values comprises storing a plurality of time measurements.

9. The memory device of claim 1, wherein the one or more controllers are further configured to cause the memory device to:

store the values at a second storage component of the memory device before storing the values at the storage component, wherein the storage component comprises a non-volatile storage component, and wherein the second storage component comprises a volatile storage component.

10. The memory device of claim 1, wherein the memory device comprises the storage component, or wherein the storage component is coupled with the memory device.

11. The memory device of claim 1, wherein the plurality of temperature ranges are associated with one or more operating conditions of the memory device.

12. A memory device, comprising:
an array of memory cells;
one or more temperature sensors configured to output a plurality of temperatures associated with the array while the memory device operates over one or more power cycles;
a plurality of counters coupled with circuitry that is coupled with the one or more temperature sensors, each counter of the plurality of counters associated with a corresponding temperature range of a plurality of temperature ranges and configured to determine a corresponding time duration over the one or more power cycles that the memory device is operating within the corresponding temperature range based at least in part on the counter incrementing by a value indicating the corresponding time duration, wherein incrementing the counter by the value comprises accumulating a count of signal transitions of an oscillating signal, the count corresponding to the value indicating the corresponding time duration;
a clock divider coupled with one or more signal sources of the memory device and operative to output the oscillating signal, wherein the clock divider is operable to scale a signal frequency of the oscillating signal based at least in part on the corresponding temperature range, and wherein the values are based at least in part on the scaling; and
a storage component coupled with the plurality of counters and configured to store the values associated with the plurality of counters.

13. The memory device of claim 12, wherein the scaling comprises:
accelerating, or decelerating, the incrementing of the plurality of counters based at least in part on the plurality of temperature ranges, wherein the values comprise a plurality of effective values corresponding to effective time durations based at least in part on the acceleration or deceleration.

14. The memory device of claim 12, wherein the scaling is based at least in part on scaling a clock rate associated with the one or more signal sources, wherein the one or more signal sources comprise one or more clock signal sources, one or more base clock signal sources, one or more self-refresh oscillators, or any combination thereof.

15. The memory device of claim 12, further comprising:
second circuitry coupled with the plurality of counters, wherein the second circuitry is configured to:
add the values to a plurality of first total values associated with the plurality of temperature ranges, wherein storing the values comprises storing the plurality of first total values after the adding; or
add the values to a plurality of second total values stored at the storage component.

16. The memory device of claim 12, further comprising:
second circuitry coupled with the plurality of counters and configured to add, after storing the values, one or more values for each temperature range of the plurality of temperature ranges.

17. The memory device of claim 12, further comprising:
second circuitry coupled with the plurality of counters and configured to convert the values to a plurality of time measurements corresponding to the corresponding time durations, wherein storing the values comprises storing the plurality of time measurements.

18. A method by a memory device, comprising:
receiving, while the memory device operates over one or more power cycles, a plurality of temperatures from one or more temperature sensors of the memory device;
determining, for each temperature and a corresponding temperature range of a plurality of temperature ranges, each temperature range of the plurality of temperature ranges being associated with a respective counter of a plurality of counters, a corresponding time duration over the one or more power cycles that the memory device is operating within the corresponding temperature range by incrementing a respective counter of the plurality of counters associated with the corresponding temperature range by a value indicating the corresponding time duration, wherein incrementing the respective counter by the value comprises accumulating a count of signal transitions of an oscillating signal, the count corresponding to the value indicating the corresponding time duration;
scaling a signal frequency of the oscillating signal based at least in part on the corresponding temperature range, wherein determining the corresponding time duration is based at least in part on the scaling; and
storing the values associated with the plurality of counters at a storage component associated with the memory device.

* * * * *